Feb. 8, 1966  C. S. DANIELS  3,233,710

ELECTROMAGNETIC CLUTCH

Filed June 25, 1963

INVENTOR.
CHARLES S. DANIELS

BY
*Mandeville & Schweitzer*
ATTORNEYS

United States Patent Office 3,233,710
Patented Feb. 8, 1966

3,233,710
ELECTROMAGNETIC CLUTCH
Charles S. Daniels, Woodbury, Conn., assignor to Consolidated Electronics Industries Corp., Waterbury, Conn., a corporation of Delaware
Filed June 25, 1963, Ser. No. 290,400
5 Claims. (Cl. 192—84)

The present invention relates to electromagnetic clutches and more particularly to improvements in clutch mechanisms of the type utilizing a stationary solenoid coil and a rotatable, axially displaceable armature. The clutch mechanism of the present invention provides extremely high speed and positive electromechanical actuation through the cooperation of a dished resilient clutch spring and a cylindrical clutch drum.

Specifically, the clutch mechanism of the invention comprises an input element freely rotatable about an armature shaft, a dished resilient clutch spring fixed to the input element, and an output element and a clutch drum fixed to the armature shaft. The armature shaft is freely rotatable in a stationary solenoid coil while also being axially movable relative thereto between "normal," non-transmitting and "active," torque-transmitting positions. In accordance with the invention, the dish-shaped clutch spring is smooth-surfaced and may be rapidly engaged with the clutch drum, which also is smooth-surfaced, through a slight axial movement of the armature shaft to transmit the torque of the input element to the output element. The requisite axial displacement of the armature shaft from the "normal" to the "active" position, for transmission of torque from the input element to the output element, is effected by energization of the stationary solenoid coil.

In accordance with another aspect of the invention, return of the shaft from the "active" to a "normal" position in an opposite axial direction to disengage the clutch members is effected by the clutch spring itself. This important aspect of the invention, that the spring is self-disengaging upon de-energization of the solenoid coil, is due to the inherent resiliency of the dish-shaped clutch spring, which is of sufficient magnitude to urge the clutch drum out of motion-transmitting engagement therewith. In accordance with the principles of the invention, the clutching action between the clutch spring and the clutch drum provides virtually instantaneous starting or transmission, since torque is transmitted through the engagement of a pair of smooth surfaces rather than through the engagement of more conventional keyed or referenced surfaces.

As another aspect of the invention, a new and improved, efficient arrangement of elements minimizes the number of parts required, advantageously affecting the degree of miniaturization and the economies attainable in the production of electromagnetic clutches.

An important aspect of the invention is the provision of a convex tapered surface on a portion of the armature shaft and a concave bearing of slightly less taper to support the tapered portion for rotation when the shaft is in an "active" or torque-transmitting condition. This specific construction reduces running friction to a minimum without any significant sacrifice in the magnetic efficiency of the solenoid and armature shaft.

For a more complete understanding of the present invention, reference should be had to the following detailed description taken in conjunction with the accompanying drawings, in which.

Figure 1:
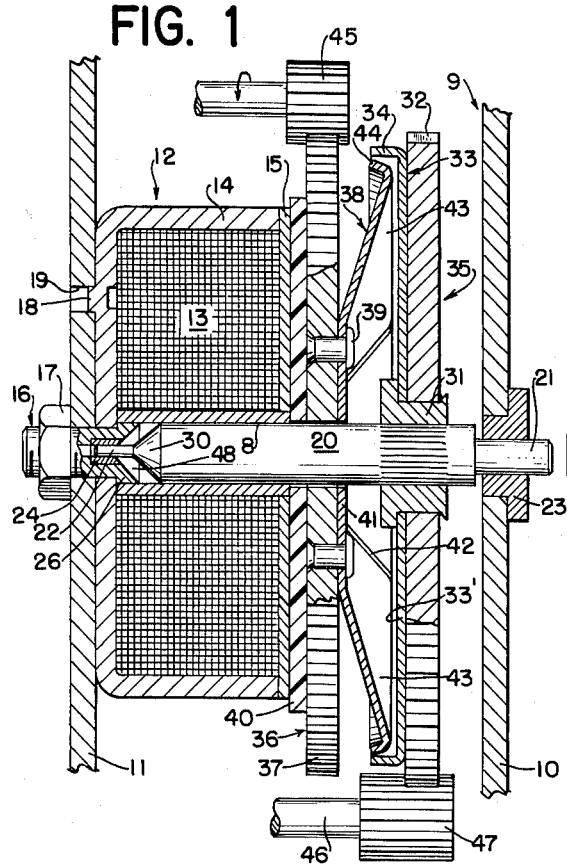
FIG. 1 is a cross-sectional view of an electromagnetic clutch mechanism, embodying the principles of the present invention, in which the clutch members are disengaged.
Figure 2:
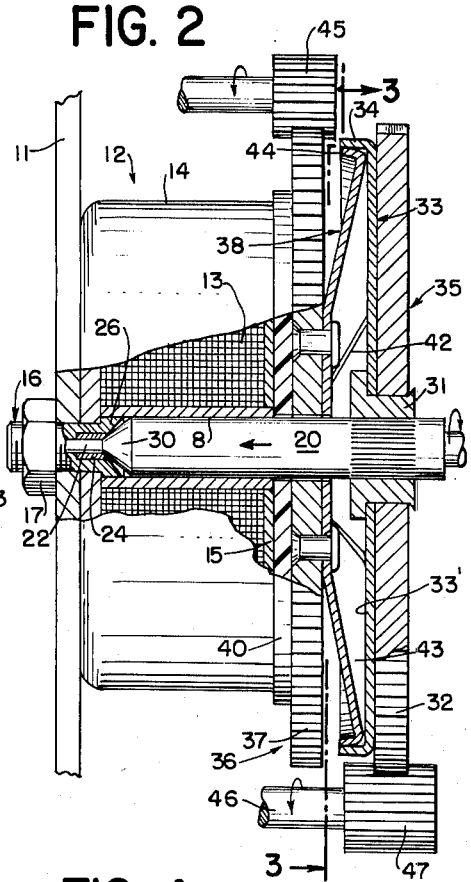
FIG. 2 is a cross-sectional view of the clutch mechanism of FIG. 1 in which the clutch members are in an engaged condition.

With reference to FIGS. 1 and 2 of the drawings, the clutch mechanism of the invention is supported in a frame, indicated generally by reference numeral 9, having spaced front and rear walls 10, 11, respectively. A solenoid assembly 12, comprising a coil 13 wound about a spool 8 and enclosed by a cup-shaped housing 14 and disc 15, both of which are made of magnetic flux carrying material, is fixedly mounted on the rear wall 11 by special stud 16 and a nut 17. Advantageously, the housing 14 has a locating tab 18 formed therein which cooperates with an opening 19 in the frame wall 11 to facilitate location and mounting of the solenoid 12.

An armature shaft 20 formed of magnetic flux carrying material and having reduced front and rear portions 21, 22, respectively, is supported for rotation and limited axial movement by front and rear journal bearings 23, 24, respectively. The front bearing 23 is mounted in the front frame wall 10 and supports the front portion 21 of the armature shaft.

Figure 4:
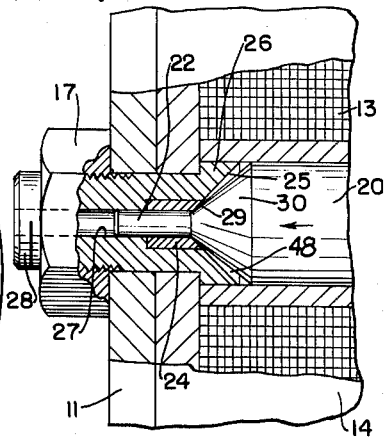
FIG. 4 is an enlarged, cross-sectional view showing the details of construction of the mechanism of FIG. 1.

As shown best in FIG. 4, the stud 16 has a conical recess 25 in its head 26 and a stepped internal bore 27 in its threaded shank 28. The bearing 24 is supported in the stepped bore 27 and defines the apex portions 29 of the conical recess 25. Support of the rear end portion 22 of the armature shaft is provided by the bearing 24.

As shown in FIG. 4, the reduced end portion 22 of the armature shaft is joined to the major portion of the shaft by a conical portion 30, having a predetermined taper which is slightly sharper than the taper of the conical recess 25. Typically, the difference in the tapers of the recess 25 and conical portion 30 is in the order of one degree (1°). Thus, a tapered magnetic flux gap 48 is defined between the convex and concave surfaces of the shaft and the recess.

In accordance with the invention, when the armature shaft 20 is in a torque-transmitting position, as shown in detail in FIG. 4, the friction forces will act only at the apices of the tapered elements 25, 30. Accordingly, the actual surface contact will be effectively minimized. Thus, any friction forces which may be developed will be acting on a relatively small diameter of the shaft so as to reduce the resistive frictional torque to a minimum. The specific tapered relationship of the shaft and recess is such that the magnetic efficiency of the armature shaft 20 and the solenoid 12 remains substantially that of an untapered gap.

A hub 31, which carries an output gear 32 and a cylindrical clutch drum 33 having a flat base 33' and a rearwardly extending, smooth-surfaced circumferential rim 34, is fixed by a force fit to the shaft 20 toward the front end thereof. The drum 33, gear 32, and shaft 20, collectively designated generally by the reference numeral 35, constitute the output member of the clutch mechanism of the invention.

Figure 3:
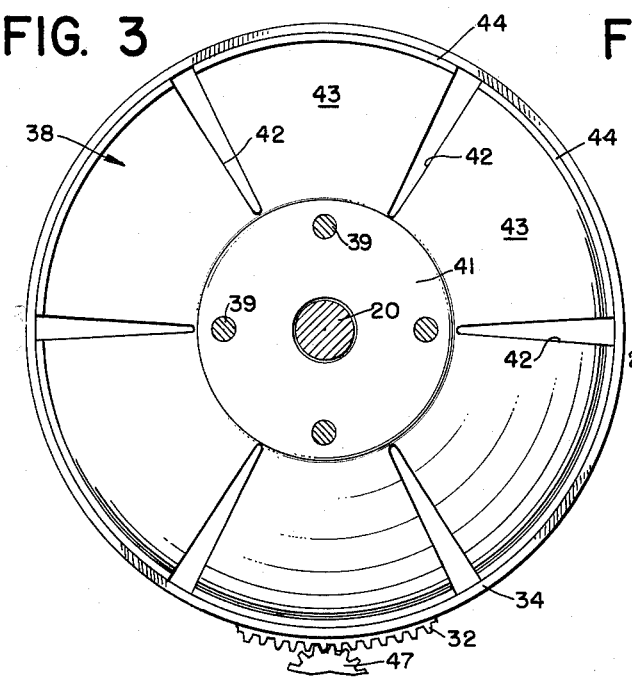
FIG. 3 is a cross-sectional view of the mechanism of FIG. 2 taken along line 3—3 thereof.

The input member of the clutch mechanism is generally designated by the reference numeral 36 and comprises a gear 37, mounted for normally free rotation about the shaft 20, and a dish-shaped clutch spring 38 fixed to the gear 37 by rivets 39. The input gear is spaced from the front cover 15 of the clutch solenoid 12 by a thrust bearing 40, which may be formed of a plastic bearing material, such as tetrafluoroethylene ("Teflon"). As shown best in FIG. 3, the clutch spring 38, which advantageously is fabricated from a resilient sheet material, has a central hub 41 and radial slots 42, emanating therefrom, which define radially and forwardly projecting spreaders 43 therebetween. Each of the spreaders 42 has a rearwardly extending, smooth-surfaced flange 44 integral therewith. In accordance with the invention, the flanges 44 are immediately proximate and within the profile of the rim 34 of the drum 33.

The clutch mechanism of the present invention operates as follows: In a "normal" or inoperative position (shown in FIG. 1), the input member 36 and output member 35 are disengaged. When in this condition, the input gear 37 may be freely rotated about the shaft 20 by a driving pinion 45, while the output gear 32, which transmits its motion to an output shaft 46 through a spur gear 47, is non-rotating due to the forward position of the armature shaft 20, allowing the drum 33 to clear slightly the flanges 44 of the clutch spring 38. In actual practice, it has been found that optimum response (minimum "take-up time") of the mechanism to solenoid actuation may be obtained with minimal or virtually negligible clearances between the spreader flanges 44 and the drum rim 34. However, to illustrate more clearly the principles of operation, the specific clearances and the geometric proportions of the clutch spring in relation to the clutch drum have been slightly exaggerated in the drawings.

In an "active" or motion-transmitting condition, the input and output members are engaged, as shown in FIG. 2, by the energization of the solenoid 12. The flux developed in the coil 13 acts magnetically on the armature 20 through the tapered gap 48 to overcome the resilience of the spring 38 and to draw the armature shaft slightly rearwardly, seating the conical portion 30 in the conical recess 25. In accordance with the invention, the slight rearward axial movement of the shaft causes the dished spring 38 to tend to be flattened by the base 33' of the clutch drum. As will be understood, a flattening of the spring causes its outer diameter to be increased and its flanges 44 to be forced radially outward into firm and immovable contact with the rim 34 of the drum.

Virtually instantaneous torque transmission will be achieved since the spring flanges 44 are maintained immediately proximate the clutch drum rim 34. The slight rearward armature movement instantly engages the two smooth-surfaced clutch members. Thus, the rotary motion of the input gear 37 will be transmitted through the flattened spring 38 and the clutch drum 33 to the output gear 32 and therethrough to the output shaft 46. It will be appreciated that the running friction between the armature shaft and the bearing 24, and the resistive torque thereof, will be minimized due to the minimal contact of their convex and concave tapered surfaces.

Upon de-energization of the solenoid, the inherent resilience of the clutch spring 38 in tending to return to its original dished shape will be sufficient to overcome any friction and to urge the base of the clutch drum forward to disengage the input member 36 from the output member 35, returning the mechanism to its "normal" condition, shown in FIG. 1.

It should be understood that the action of the spring is such that a minimal rearward axial displacement causes a flattening or spreading of the spring and the consequent application of large radial forces to the flanges 44 against the rim 34. The leverage of the spring is more than sufficient to insure holding even with the low coefficients of friction of the smooth-surfaced members. Thus, the clutch mechanism disclosed has virtually no "take-up time" when actuated and provides substantially instantaneous transmission from the input member to the output member.

The electromagnetic clutch mechanism of the present invention is of great utility in applications requiring instantaneous and reliable torque transmission upon actuation. Moreover, its relative simplicity and small number of parts make it highly suited for economical production.

Although the present invention has been described with reference to a specific, preferred embodiment, it should be understood that the disclosure has been made only by way of example and that certain changes in details of construction and arrangement of the elements may be made without departing from the spirit and scope of the invention as hereinafter claimed.

What is claimed is:

1. A controllable torque coupling device, comprising
   (a) supporting frame means,
   (b) solenoid coil means fixedly supported by said frame means,
   (c) a rotatable armature shaft mounted for rotation within, and for predetermined axial movement between inactive and torque-transmitting positions relative to said solenoid coil means,
   (d) said armature shaft having portions projecting outwardly from said solenoid coil means,
   (e) a cylindrical clutch drum fixedly mounted on one of said projecting portions,
   (f) a one-piece dish-shaped resilient clutch spring mounted on said one projecting portion in a predetermined spaced relation with said clutch drum,
   (g) said spring having a substantially fixed axial position with respect to said solenoid coil means,
   (h) said solenoid coil upon energization being electromagnetically linked with said armature shaft to move said shaft from said inactive position a predetermined axial distance sufficient to cause said clutch drum to engage said clutch spring,
   (i) said engagement thereby tending to flatten said dish-shaped spring to couple securely for torque transmission said spring to said drum,
   (j) said spring tending to assume its normal, dished shape and urging said shaft through said drum into said inactive position upon the de-energization of said solenoid means.

2. The clutch mechanism of claim 1, in which
   (a) said drum has a circular flange of a predetermined diameter,
   (b) said dish-shaped spring has an outer diameter less than, but approximately equal to, said predetermined diameter,
   (c) said spring being flattenable to have an outer diameter greater than said predetermined diameter of the circular flange of said drum,
   (d) said spring exerting substantial radial force on said flange when said spring is flattened within said circular flange.

3. The mechanism of claim 1, which includes
   (a) means for supporting said shaft within said solenoid coil,
   (b) said means defining a conically shaped recess of predetermined taper,
   (c) said shaft having an intermediate, conically shaped portion adapted to enter said recess,
   (d) said portion and said supporting means defining a tapered gap therebetween,
   (e) said supporting means and said tapered portion having mutual contact limited to the apex of said recess and the apex of said tapered portion.

4. An electromagnetic clutch mechanism, comprising
   (a) a solenoid coil means,
   (b) an armature shaft mounted for rotation about a predetermined axis,
   (c) an input member rotating about the predetermined axis,
   (d) an axially slidable output member rotatable about said axis,
   (e) a radially expandable, axially compressible, one-piece dish-shaped spring having integral spreader flange means carried by one of said input and output members, (f) said spring spreader flange means having a predetermined outer diameter when the dish-shaped spring is axially unstressed,
(g) said predetermined outer diameter of said spreader flange means being increasable to a greater diameter when said spring is axially stressed,
(h) a cylindrical clutch drum carried by the other of said input and said output members and having an axially extending peripheral flange,
(i) said peripheral drum flange having a diameter slightly greater than said predetermined diameter of said spreader flange but less than said greater diameter of said spreader flange means,
(j) said armature shaft supporting one of said input and output members,
(k) said armature shaft being axially movable upon the energization of said solenoid coil means to displace axially said one supported member toward the other member to engage said drum with said spring,
(l) said spring being axially compressed and its spreader flange means thereby radially expanded against said peripheral drum flange upon said engagement to transmit rotation of said input member to said output member.

5. The mechanism of claim 4, in which
(a) a bearing having a conical recess supports said armature shaft for rotation therein and limited axial movement relative thereto,
(b) said armature shaft has a conical portion of sharper taper than said recess,
(c) the apex of said shaft conical portion is seated in the apex of said conical recess,
(d) whereby said conical recess and said conical portion define a non-uniformly tapered gap therebetween.

References Cited by the Examiner
UNITED STATES PATENTS

| | | | |
|---|---|---|---|
| 261,887 | 8/1882 | Whitney | 192—65 |
| 2,841,258 | 7/1958 | Jewell. | |

FOREIGN PATENTS 1,166,920  6/1958  France.

DAVID J. WILLIAMOWSKY, *Examiner.*

DON A. WAITE, *Primary Examiner.*